United States Patent [19]
De Mendoza Sans

[11] Patent Number: 5,938,526
[45] Date of Patent: Aug. 17, 1999

[54] URBAN AIR POLLUTION DRAINAGE DEVICE

[76] Inventor: Juan Fernando De Mendoza Sans, Avda, Diagonal, 466, 6, Barcelona, Spain, 08006

[21] Appl. No.: 09/001,202

[22] Filed: Dec. 30, 1997

[30] Foreign Application Priority Data

Jan. 4, 1997 [DE] Germany ............................ 197 00 199

[51] Int. Cl.⁶ .................................................. F24F 7/007
[52] U.S. Cl. .......................................................... 454/341
[58] Field of Search ................... 454/341, 370, 454/1, 2, 16

[56] References Cited

U.S. PATENT DOCUMENTS 3,643,581  2/1972  Feldman .................................. 454/341

*Primary Examiner*—Harold Joyce
*Assistant Examiner*—Derek S. Boles
*Attorney, Agent, or Firm*—Richard M. Goldberg

[57] ABSTRACT

Device for drainage of contaminated urban atmospheres, including a plurality of air propellers, with an air intake below or on the side thereof and with an air output oriented upward; towers having a height greater than 100 meters; supports on which the air propellers are fixed, the supports capable of sliding vertically over the towers such that the supports can be immobilized within a stratus of hypercontaminated air that forms over some urban areas during anticyclonic periods and/or with thermal inversion, in such a way as the air propellers suction supercontaminated air from the stratus and project the supercontaminated air upward to a great height until the supercontaminated air reaches atmospheric zones naturally ventilated; and screens and mufflers to reduce acoustic intrusion produced by the air propellers.

11 Claims, 3 Drawing Sheets

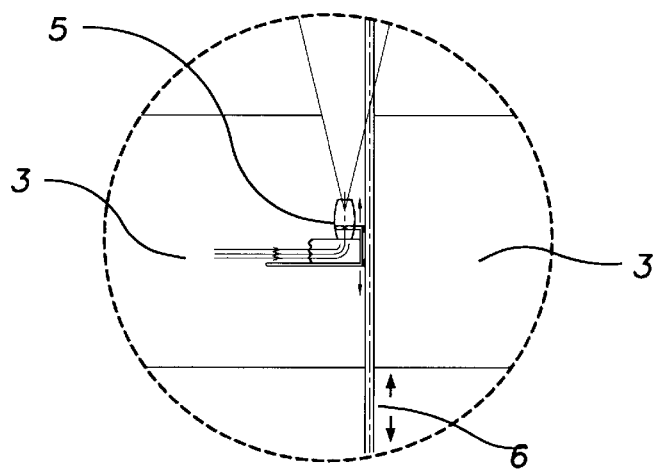
FIG.2
FIG.3
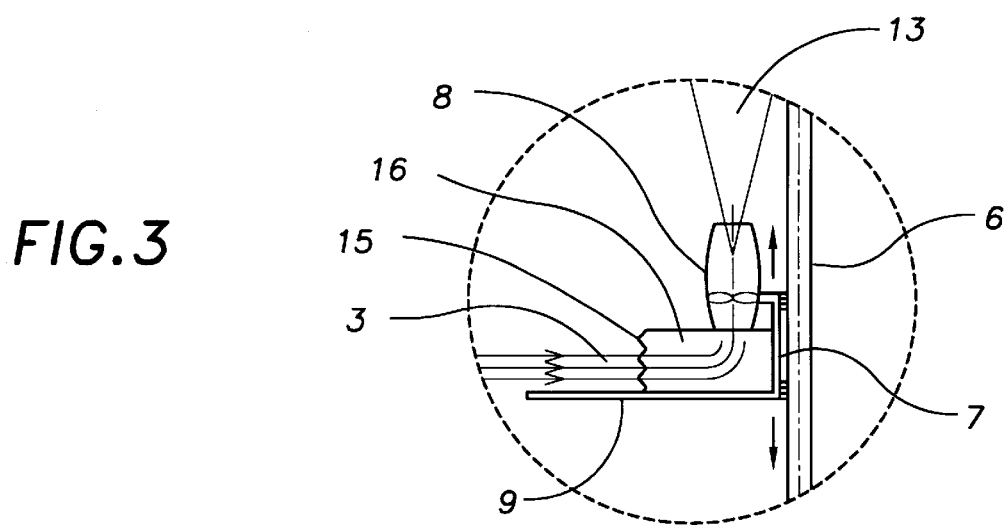
FIG.4A
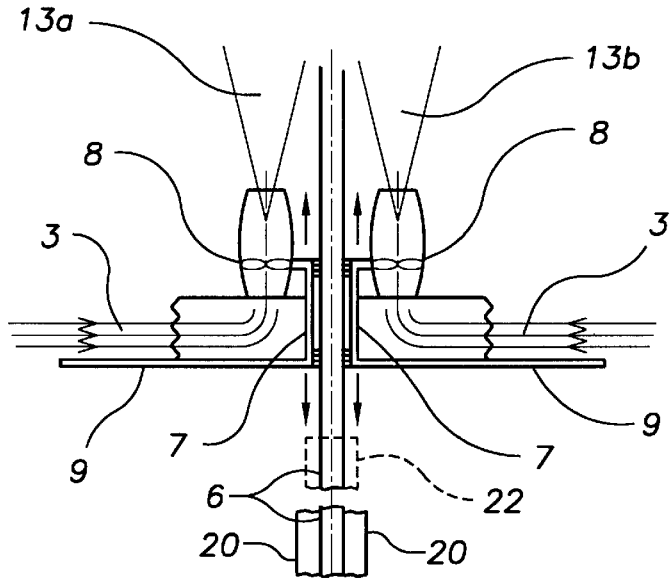

URBAN AIR POLLUTION DRAINAGE DEVICE

BACKGROUND OF THE INVENTION

The Air City Tower (ACT) is a device for the drainage of contaminated urban atmospheres consisting of one or several air propellers, with the air intake at the bottom or on the side and the air output oriented upward, fixed to a support capable of sliding vertically over a structure or an immobile tower of great height (more than 100 m), or to a mobile tower with the propellers' support fixed on the tower that would also move up and down vertically with the propellers' support fixed on the tower, or simultaneously both dispositions; this would allow the propellers to be placed within the stratus of hypercontaminated air that forms at dawn over some urban areas during the anticyclonic periods with thermal inversion and under the level of such inversion, and to suction the supercontaminated air from that stratus projecting it upward several hundreds of meters above the level of inversion until it reached the zones of the atmosphere which enjoy wind speeds sufficient to transport, in a natural way, the pollution diluted in the stream far from the urban area that originated it. Moreover, foreseeing the advantageous existence in the propellers' support of acoustic mufflers, physical-chemical filtrating and decontaminant devices, as well as other systems, at the same time that, when several propellers are in place, those of higher speed would be surrounded by those of lower speed creating a turbo-fan effect that would augment the reach and reduce the sound and the consumption.

The present patent of invention refers to a device for the drainage of contaminated urban atmospheres, during the anticyclonic period and/or with thermal inversion, in which the maximum contamination indices are reached, with the goal of sensibly reducing such indices.

This constitutes a substantial advance in the techniques utilitzed until today to reduce or control the atmospheric pollution, which are directed, almost exclusively, to the control of contaminated sources, such as combustion engine exhausts through catalysts or such as industrial smoke through physical-chemical treatments, which reduce the amount of contaminants emitted daily in a specific urban area.

All these atmospheric contamination control techniques presuppose a system of natural ventilation of breezes or winds over the urban area sufficient to ensure that the quantity of contaminants definitively evacuated each day from the area is larger, or at least similar, to the quantity produced that day.

However, this is not so in periods of several days with totally or almost totally stable atmospheres or, more specifically, in the periods in which, because of the phenomena known as thermal inversion, this substitution of the clean or much less contaminated air by the contaminated air does not occur, where the contamination balance does not increase or accumulate over several days.

In such periods the quantity of contaminants emitted in one day by the urban area accumulates with that of the preceding days, arriving at very high indices of contaminants, despite maintaining control measures over the emitting sources, or other control measures especially reinforced such as the prohibition of automobile circulation, the reduction of heat produced by radiators or the control of the more contaminating industrial processes.

The problem may become as grave as to almost paralyze the activity of an urban area with the enormous economic costs that all of that entails and, worse yet, with the damage inflicted on people's health while waiting for a meteorological change that brings a system of winds and ventilates the area.

It is precisely at this moment in the process, that is to say, in the ventilation of an area where its atmosphere is stagnated due to thermal inversion, when the device here described takes effect. During this phenomena of the inversion of the atmosphere's temperature, which progressively decreases with the altitude, a change or an inversion of such decrease occurs at a determinate level, variable according to the meteorological and geographical conditions, producing, from this level on a constant increase until the thermal decrease caused by altitude is reestablished at a different height.

The graph which shows temperatures according to their altitude above the ground presents a "Z" characteristic of such thermal inversion phenomena, precisely over the layers where the highest concentration of contaminants is retained, because of the effect of such layers of rising temperature as authentic lids for the whole mass of air existing between them and the surface of the city.

An analysis of contamination in the cities according to the altitude of the atmosphere during the anticyclonic and thermal inversion periods has shown that at the hours between midnight and dawn a stratus of very high concentration of contaminants at a given height forms; this stratus is dispersed towards the ground during the first hours of the day due to the effect of the convection currents provoked by the sun's action. The hypercontaminated stratus is several tens of meters thick and is normally located between one hundred and five hundred meters above the ground, depending on the meteorological conditions.

SUMMARY OF THE INVENTION

The drainage device consists of several air propellers, and/or turbines, that take the hypercontaminated air from this stratus and hurl it upwards several hundreds of meters above the inversion layer, literally breaking the atmospheric lid that impedes the dispersion of contaminants.

The turbines must be provided in a number and power adequate for the altitude of the stream to exceedingly reach the stratus normally ventilated far above the inversion marks.

Such turbines are fixed by support onto a structure or a tower at the height corresponding to the hypercontaminated stratus at each moment making it necessary that this height be variable, something which can be well accomplished by the vertical displacement of the propellers' support, the most economically convenient in most cases, or through a variation of the height of the support tower itself, or through the combination of both dispositions.

The turbines take in the air from within the hypercontaminated stratus during its stay inside of it at dawn and project it upwards at great speed. They may operate electrically, with liquid, gaseous or solid fuels, even with hydrogen, which would mean no new contamination, according to technical and economic reasons, and are provided with sound and vibration reduction devices such as screens and mufflers. They may also incorporate filters or compartments which would neutralize or definitively eliminate the pollution in the greatest degree possible by using physico-chemical treatments.

Given the great stability of the hypercontaminated stratus, which behaves as a liquid or fluid immiscible with the strata immediately under and above it, it is possible to drain the hypercontaminated layer in a vast extension without producing mixes of the extraction with the cleaner neighboring stratus, the permanence of such stratus being the only limitation to its efficient functioning. Because of this, the turbines would be placed in a working position and would act daily between midnight and dawn.

The number of turbines per tower, the unitary power as well as the total number of towers to be established in an urban area will depend on multiple factors among which these are the most prominent: the quantity of hypercontaminated air to be evacuated according to the sanitary objectives set and the means available, the most frequent position and the thickness of the stratus to be drained, the urban configuration, the distribution of contamination and, in general, other conditions that will have to be analyzed beforehand for each city.

As a simple reference, and to give an idea of the efficiency of the system, a single tower with a total drainage capacity of 50,000 m3 /h, working eight night hours per day, is capable of definitively evacuating the total contamination produced in an urban area of 150 km2 (the size of Barcelona) in three hours, that is around 4.5 Tm of contaminants. This is considerably efficient since this reduction alone would guarantee that the maximum established levels, with actual emissions, would never be exceeded. Similarly, a stable degree of low contamination during the periods of thermal inversion could be maintained.

Cities which nowadays literally drown in their own contamination because of their geographic location and/or their level of development could maintain levels of contamination similar to those of other cities which enjoy a much more favorable natural ventilation.

From these references it is clearly derived the importance of the limits of application of the invention here claimed. In particular, it would be extraordinarily beneficial to implement these towers in cities of great density surrounded by mountains that limit the natural ventilation and where the meteorological conditions produce frequent and prolonged periods of thermal inversion.

It is foreseeable that the environmental demands of a population ever more sensible to the conservation of its vital environment should extend the scope of application of this invention beyond the limit situations evoked, in order to obtain drastic improvements in the quality of air.

BRIEF DESCRIPTION OF THE DRAWINGS

To ease the explanation of this report, a sheet of drawings is attached in which are represented, as an illustrative example and not a limiting one, several configurations of devices for the drainage of contaminated urban atmospheres according to the principles of this claim, having changed in them the number of air propellers, in this case turbines.

In the drawings:

FIG. 2 presents a schematic detail of the arrangement of the propellers inside the hypercontaminated stratus, while in FIG. 3 there is a representation of a detail of FIG. 2, in which it is pointed out the way the propellers, which are fixed to a support with an acoustic screen and which can slide vertically over a tower which can be or mobile vertically, are positioned and work.

Finally, in FIGS. 4A–4D, there are representations of alternative ways of placing the propellers when these are placed in a variable number and are greater than one.

DETAILED DESCRIPTION

Figure 1:
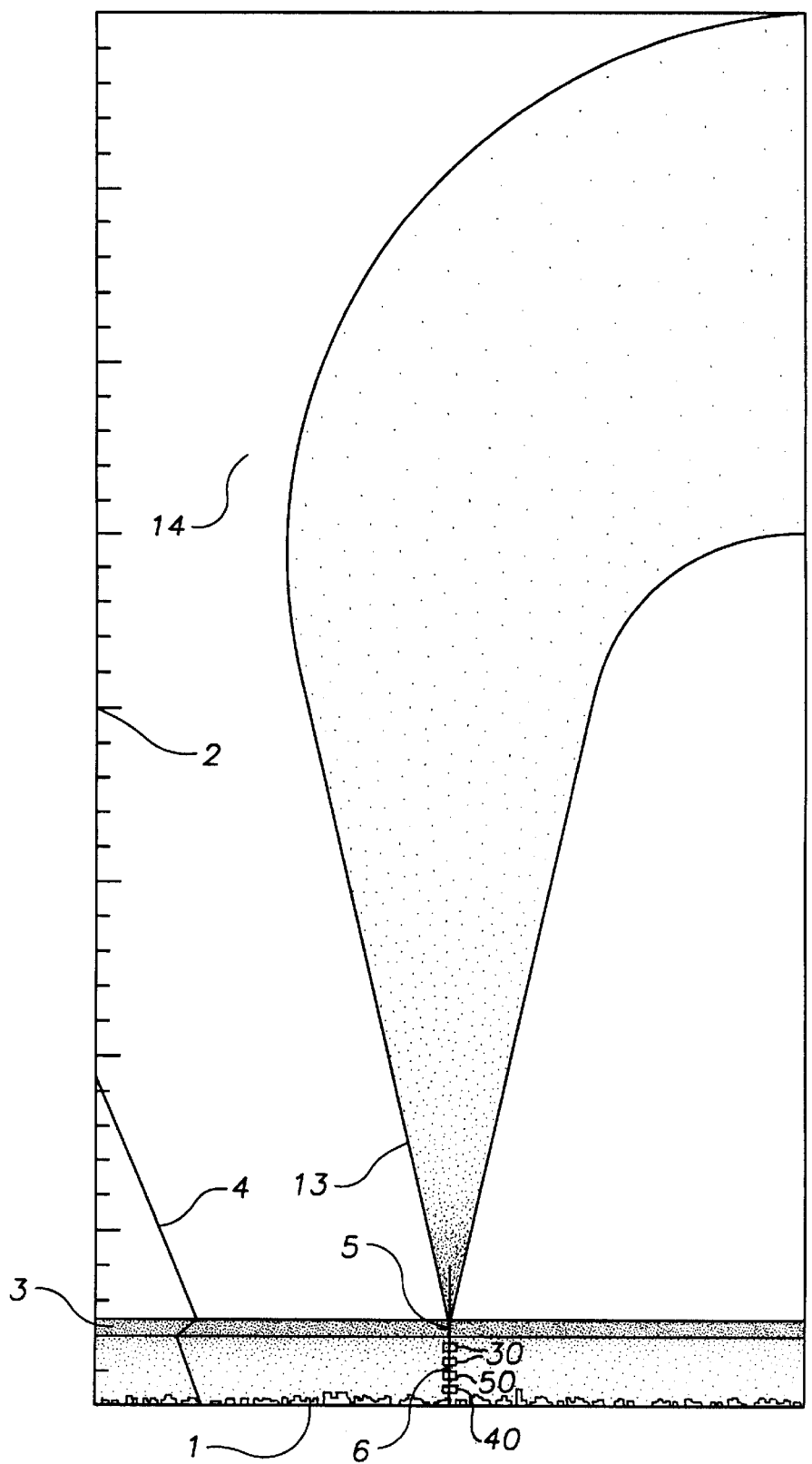
FIG. 1 presents a vertical section of an atmosphere over a city, in which the claimed device has been placed, under conditions of thermal inversion, and in which the functioning of the invention may be observed.

Such as it is possible to deduce from the indicated page of drawings, the graph shown in FIG. 1 represents the section through a vertical plane of a city (1) according to different heights (2), the height of the contaminated layer (3) following the line in the form of a "Z" (4), the typical graph of the atmosphere's temperature, lowering as the height over the ground increases—except in the zone of thermal inversion in which, on the contrary, they increase creating the effect of a horizontal barrier that blocks the vertical flux of air, producing the accumulation of contaminants emitted from the ground under the inversion.

A drainage device (5) has been placed in the city (1) which corresponds to the object of the present invention placed on a tower (6), representing the case of a support (7) of the propellers (8) sliding vertically over a fixed tower, or a tower that may also be vertically mobile by having a telescopic design that is retractable or sheathable into a silo 20 made in the ground so that the propellers be located within the range of the heights reachable by the tower, inside the hypercontaminated stratus, whatever its height may be, and which is a function of the meteorological conditions. The tower 20 can alternatively have a telescopic design itself with outer and inner sleeves, as shown by the dashed lines in FIG 4A. These heights will be determined for each city by the studies performed beforehand.

Figure 4B:
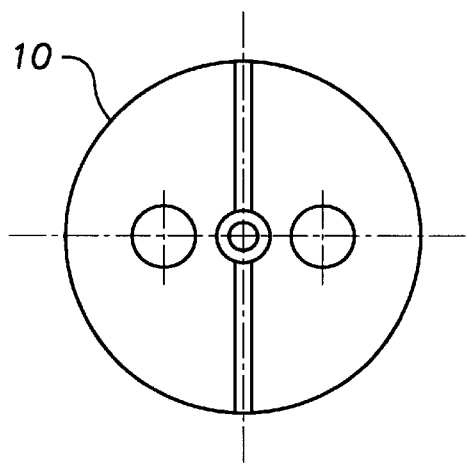
Figure 4C:
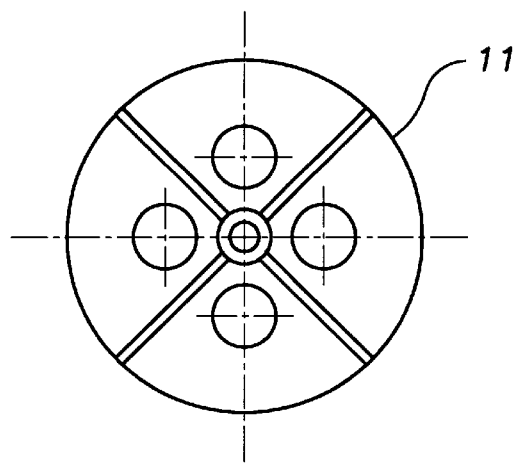
Figure 4D:
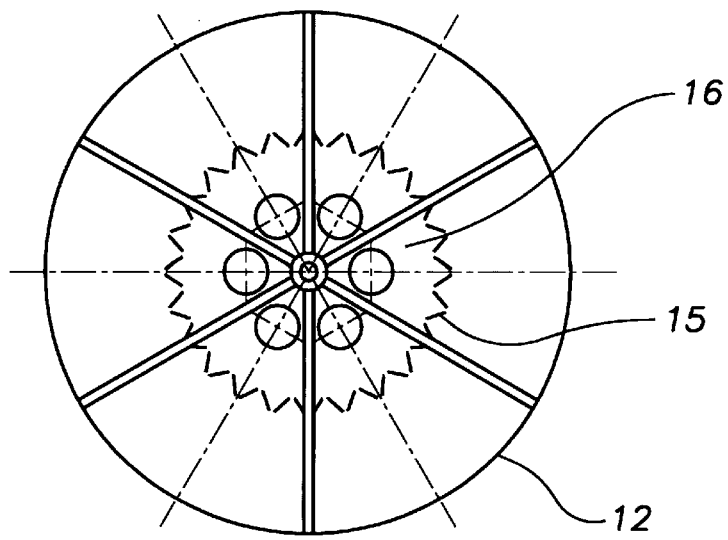

The propellers (8) that are in the zone corresponding to the hypercontaminated stratus (3) can be unitary, such as it is shown in FIG. 3, or as it is shown in FIGS. 4B–4D, double (10), quadruple (11), sextuple (12), or in any number and arrangement.

The air suctioned from the hypercontaminated layer (3) is hurled upward (13) at great velocity reaching the highest zones of the atmosphere (14) in which there is enough wind velocity to transport the pollutants suspended and diluted in the stream or panache produced by the device far from the urban area, causing a dispersion effect of the contamination that produces the natural ventilation of the urban atmosphere when it is not stagnated under anticyclonic conditions and, above all, with the formation of thermal inversions.

Acoustic screens (9) may be attached advantageously onto the whole body of propellers (8) or onto their support (7) to cushion the sound perceptible from the ground in order not to exceed the fixed sound indices, but also filters (15) as well as compartments for the physical-chemical treatment of the contamination (16) that may hold or process the pollution partially or eliminate it permanently.

In the case in which there may be several propellers it might be advantageous to give them different velocities so that those of higher velocity may be surrounded by those of lower velocity such that streams of air 13a having a first velocity are surrounded by streams of air 13b having a lower velocity than the first velocity, thereby creating a turbo fan effect that would augment the reach and diminish the sound impact and the consumption.

Systems of analysis 30 of the atmosphere can be located at different heights of the tower 6, as shown in FIG. 1.

A telecommunications system 40 can be provided on the tower 6 for study of at least one of (a) city traffic control, (b) air traffic control, and (c) ground traffic control.

An observatory 50 can be provided on the tower 6 for study of at least one of (a) city traffic control, (b) air traffic control, and (c) ground traffic control.

The detailed characteristics of the air propellers, their support, and the support of the tower itself are not the essence of the invention claimed. The essence is in the group of propellers supported by a tower or a structure sufficiently tall or resistant for this function and which allows to place them at different heights as it may convene, either through the vertical sliding of their support over the tower, or through the vertical sliding of part or the whole tower, or by a combination of both movements which would allow to cloak the tower outside the periods in which it is required to function.

I claim:

1. Device for drainage of contaminated urban atmospheres, comprising:

at least one air propeller, with an air intake below or on the side thereof and with an air output oriented upward, a tower having a height greater than 100 meters relative to a around surface, a support on which said at least one air propeller is fixed, said support being mounted on said tower for vertical movement so as to provide vertically adjustability of said at least one air propeller relative to the ground surface, such that said support can be immobilized within a stratus of hypercontaminated air that forms over some urban areas during anticyclonic periods and/or with thermal inversion, in such a way as said at least one propeller suctions supercontaminated air from said stratus and projects said supercontaminated air upward to a great height until said supercontaminated air reaches naturally ventilated atmospheric zones.

2. Device for drainage of contaminated urban atmospheres according to claim 1, wherein the support of the at least one air propeller is fixed on the tower, with said tower being movable vertically at least in part as a result of a telescopic design of the tower.

3. Device for drainage of contaminated urban atmospheres according to claim 1, further comprising screens and mufflers to reduce acoustic intrusion produced by the at least one air propeller.

4. Device for drainage of contaminated urban atmospheres, comprising:

a plurality of air propellers with an air intake below or on the side thereof and with an air output oriented upward, and with variable velocities such that streams of air having a first velocity are surrounded by streams of air having a lower velocity than said first velocity and forming a turbo fan configuration in order to reduce a sound impact and to reach greater heights of contaminant ejection, a tower having a height greater than 100 meters, and a support on which said air propellers are fixed, said support being mounted on said tower for vertical movement so as to provide vertically adjustability of said at least one air propeller relative to the ground surface, such that said support can be immobilized within a stratus of hypercontaminated air that forms over some urban areas during anticyclonic periods and/or with thermal inversion, in such a way as said propellers suction supercontaminated air from said stratus and project said supercontaminated air upward to a great height until said supercontaminated air reaches atmospheric zones naturally ventilated.

5. Device for drainage of contaminated urban atmospheres according to claim 1, further comprising systems of analysis of the atmosphere at different heights of the tower.

6. Device for drainage of contaminated urban atmospheres according to claim 1, further comprising telecommunication systems for study of at least one of:

(a) city traffic control, (b) air traffic control, and (c) ground traffic control.

7. Device for drainage of contaminated urban atmospheres according to claim 1, wherein said at least one propeller is selected from the group consisting of compressors, turbines, helices and vanes.

8. Device for drainage of contaminated urban atmospheres according to claim 1, wherein said support includes a mobile module that supports the at least one propeller, and further comprising systems of analysis of the atmosphere at different heights of the mobile module.

9. Device for drainage of contaminated urban atmospheres according to claim 1, further comprising observatories for study of at least one of:

(a) city traffic control, (b) air traffic control, and (c) ground traffic control.

10. Device for drainage of contaminated urban atmospheres according to claim 1, wherein the support of the at least one air propeller is fixed on the tower, with said tower being movable vertically at least in part as a result of being retractable into the ground.

11. Device for drainage of contaminated urban atmospheres according to claim 1, further comprising compartments for the physical/chemical treatment of contamination that may hold or process pollution partially or eliminate the pollution permanently.

* * * * *

UNITED STATES PATENT AND TRADEMARK OFFICE
CERTIFICATE OF CORRECTION

PATENT NO : 5,938,526
DATED : August 17, 1999
INVENTOR(S): Juan Fernando De Mendoza Sans It is certified that error appears in the above-identified patent and that said Letters Patent is hereby corrected as shown below:

Column 5, line 16, change "around" to --ground--.

Signed and Sealed this

Fourth Day of January, 2000

Attest:

Attesting Officer

*Acting Commissioner of Patents and Trademarks*